(12) United States Patent
Ota et al.

(10) Patent No.: US 6,308,944 B1
(45) Date of Patent: Oct. 30, 2001

(54) ASSEMBLY JIG INCLUDING A FIXTURE FOR A PERFORATED PANEL

(75) Inventors: Norio Ota; Hajime Kato, both of Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/447,575

(22) Filed: Nov. 23, 1999

(30) Foreign Application Priority Data

Nov. 25, 1998 (JP) .................................................. 10-334602

(51) Int. Cl.⁷ ....................................................... B23Q 3/02
(52) U.S. Cl. ............................ 269/97; 269/900; 269/903; 269/296
(58) Field of Search ................................. 269/97, 47, 38, 269/53, 69, 95, 297, 99, 100, 900, 903, 296

(56) References Cited

U.S. PATENT DOCUMENTS

| 287,884 | * | 11/1883 | Stone | 269/296 |
| 5,168,904 | * | 12/1992 | Quinkert | 269/903 |
| 5,215,297 | * | 6/1993 | Sato et al. | 269/296 |
| 5,490,664 | * | 2/1996 | Justus et al. | 269/903 |
| 5,630,576 | * | 5/1997 | Williams | 269/296 |
| 5,988,615 | * | 11/1999 | Churoux | 269/47 |
| 6,003,852 | * | 12/1999 | Kawamura | 269/903 |

FOREIGN PATENT DOCUMENTS

| 0625785 | 11/1994 | (EP) . |
| 2295497 | 5/1996 | (GB) . |
| 3-114111 | 5/1991 | (JP) . |
| 5-62542 | 3/1993 | (JP) . |
| 5-114315 | 5/1993 | (JP) . |
| 5-69823 | 9/1993 | (JP) . |

OTHER PUBLICATIONS

English Language Abstract of JP 5–114315.
English Language Abstract of JP 3–114111.

* cited by examiner

*Primary Examiner*—Derris H. Banks
*Assistant Examiner*—Lee Wilson
(74) *Attorney, Agent, or Firm*—Greenblum & Bernstein, P.L.C.

(57) ABSTRACT

A wiring jig is provided with a cable receiving area which receives cables. A crank-shaped supporting member supports a pillar which supports the cable receiving area. A pressing member having a pair of locating feet is provided with a pressing screw. Tightening the pressing screw of the pressing member fastens the supporting member to a perforated panel. Loosening the pressing screw allows the supporting member to rotate and/or slide so that the pillar can be installed at any desired position without being limited by the position of mounting holes pre-formed with a predetermined spacing in a perforated panel which receive the pair of locating feet of the pressing member.

20 Claims, 4 Drawing Sheets

ASSEMBLY JIG INCLUDING A FIXTURE FOR A PERFORATED PANEL

BACKGROUND OF THE INVENTION

1. Field of the Invention

The present invention relates to an assembly jig for wire harness to be fastened to a perforated panel In which multiple holes are formed and arranged with predetermined spacing, and to a perforated panel fixture for fastening the assembly jig.

2. Description of Background Information

When assembling a wire harness, a wiring base board is used on which a number of wiring jigs are provided. Consequently, holes are formed at predetermined positions in the base board and a lower end of the wiring jig is fitted into the holes and fastened with bolts on both the top and the bottom surfaces of the perforated board. The board mounted with the wiring jig becomes the exclusive article for assembling the particular kind of wire harness.

On the other hand, since the wire harnesses follow a trend of diverse/small batch production and require assembling for test production, a wiring board which allows common use for assembly of different kinds of wire harnesses is highly desirable.

Therefore, a perforated panel in which a number of jig mounting holes are made in a matrix form has conventionally been used for a base board, and a wiring board of general configuration with wiring jigs in predetermined holes of the perforated panel has been proposed (for example, see Japanese Unexamined Utility Model Publication No. (Hei 5-69823).

This general-use type wiring board allows a wiring jig to be mounted on the top surface, but the mounting position of wiring jigs is determined by the mounting hole position that is preliminarily formed. Thus, it can be impossible to arrange the wiring jigs in the desired position on the perforated panel.

In addition, although it is considered that the mounting position can be adjusted after mounting the wiring jigs by adopting a mounting hole with an elliptical shape on the perforated panel, fastening with bolts from the top and bottom surfaces of the perforated panel is necessary in this case, thus requiring additional time and labor for mounting the wiring jigs.

Therefore, an object of the present invention is to provide a wire harness assembly jig capable of being easily fitted and removed, and which can be arranged at any position on the top surface of the perforated panel, and also to provide a perforated panel fixture for supporting this assembly.

SUMMARY OF THE INVENTION

According to a first aspect of the invention there is provided a fixture for fastening a wire harness assembling jig on a perforated panel in which multiple holes are formed and arranged with a predetermined spacing. The fixture includes a supporting member for supporting an assembly jig and a pressing mechanism for securing the supporting member onto the perforated panel. The pressing mechanism includes a pressing member having a pair of feet for positioning the pressing mechanism on one side of the panel by interfitting with two mounting holes in close proximity to each other. By the present invention, since the feet of the pressing member are fastened respectively to two mounting holes, the mounting strength of the assembly jig is high.

According to another aspect of the present invention, the pair of feet penetrate through each hole in the perforated panel and are provided with protrusions for engaging with the other side of the perforated panel. In this way, operation of the pressing mechanism from the top surface of the perforated panel can mount and remove the assembly jig.

In another aspect of the present invention, the supporting member includes a pillar supporting area which interfits with a pillar and a bench board arranged on the perforated panel. The pressing member has a transverse portion which spans the bench board and is provided at opposite ends with the pair of feet, and a pressing screw is provided on the transverse portion for pressing against the bench board. As a result, the assembly jig can be mounted at any desired position without restriction to the position of holes preformed with predetermined spacing in the perforated panel.

In a further aspect of the present invention, after mounting the assembly jig, a mere adjustment of the pressing screw allows the mounted position of the assembly jig to be easily changed. Furthermore, mounting and removing the assembly jig from the top surface of the perforated panel, as well as arranging it onto any position, can be implemented from one side of the perforated panel.

According to another aspect of the invention, there is provided an assembly jig for assembling wire harnesses with the assembly jig being fastened on a perforated panel in which multiple holes are formed and arranged with a predetermined spacing. The jig includes predetermined parts for use of assembling, including a pillar having a pointed lower end which supports the parts from a lower end, a supporting member for supporting the pillar, and a pressing mechanism for pressing and fastening the supporting member onto the perforated panel. The pressing mechanism includes a pressing member having a pair of feet for positioning the pressing mechanism from one side of the panel by interfitting with two mounting holes in close proximity to each other.

In a preferred embodiment of the invention, bracket assembly is provided for mounting a wiring harness jig on a base panel, and the wiring jig is provided with a cable receiving area which receives cables. A crank-shaped supporting member supports a pillar which supports the cable receiving area. The supporting member is fastened to a perforated panel by tightening a pressing screw of a pressing member having a pair of feet mounted in adjacent holes of the panel. Loosening the pressing screw allows the supporting member to rotate and also to slide so that the pillar can be installed at any desired position without being restricted by the position of the holes and are pre-formed with predetermined spacing in the perforated panel.

The pressing member includes a transverse bridge portion connecting the feet, with the bridge portion being spaced above the upper surface of the panel and mounting a clamping member, and the supporting member includes a base portion located under the bridge portion between the feet and engaged by the clamping member for securing the supporting member.

The support member may include a locating portion that receives a pillar of the wire harness jig, with the locating portion and the base portion being arranged at opposite ends of a connection portion, whereby in use, the locating portion is spaced from the upper surface of the panel. The pillar may include a pointed lower end that positions the pillar on the panel. Additionally, the locating portion may include a hole in which the pillar is received and fixed intermediate its ends, and the base portion and the locating portion may extend parallel to each other in opposite directions from opposite ends of the connection portion.

According to a further aspect of the invention, the combination of the bracket assembly with a perforated panel formed with a plurality of holes having a predetermined spacing for receiving the feet of the pressing member is provided. The holes in the panel may be aligned in two directions at right angles to each other, and the holes may be uniformly spaced apart in each direction or the spacing of the holes in one direction is different to that in the other direction.

BRIEF DESCRIPTION OF THE DRAWINGS

The invention will be described below in detail with reference to the accompanying drawings in which similar elements are indicated by similar reference numerals, and wherein.

DETAILED DESCRIPTION OF THE PRESENT INVENTION

Figure 1:
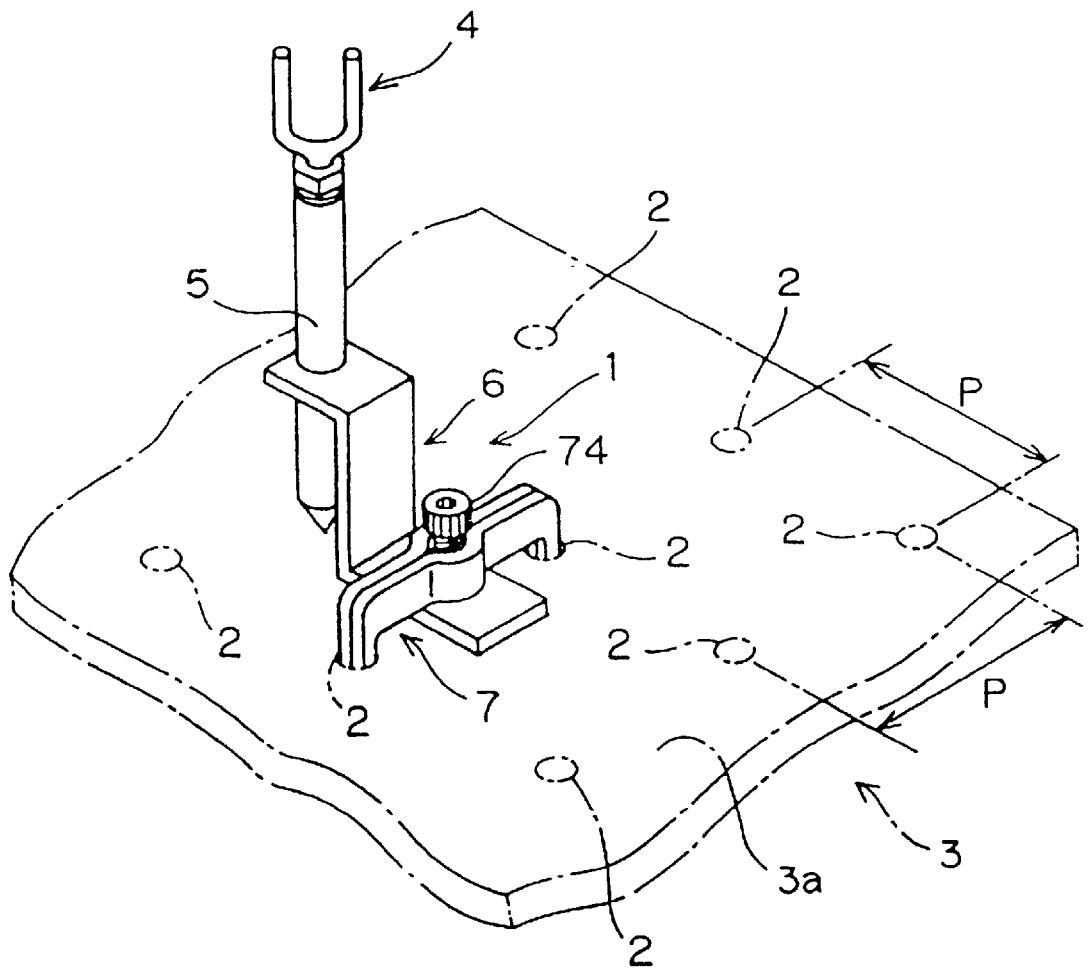
FIG. 1 is a perspective view showing an embodiment of the wiring jig of the present invention in which the wiring jig is mounted on a perforated panel.

As illustrated in the accompanying drawings, FIG. 1 represents a perspective view showing an embodiment of the invention in which one wiring jig 1 for an assembly jig is mounted on a perforated panel 3. The wiring jig 1 is provided with a cable receiving area 4 supported by a pillar 5 from the lower side. The pillar 5 is supported by a crank-shaped supporting member 6 fastened to the surface 3a of the perforated panel 3 by a pressing member 7.

The perforated panel 3 is formed as a flat board having a predetermined thickness and is, for example, constructed from a metallic plate, although any suitable material may be used. A number of generally circular mounting holes 2 are provided in the board which penetrate through the top surface 3a and bottom surfaces 3b of the flat board. The mounting holes 2 are aligned in two directions at right angles to each other, e.g., longitudinal and transverse directions of the board. In each direction, the holes 2 are arranged at predetermined regular intervals of a certain pitch P, but with a different pitch between the vertical and the horizontal directions.

Figure 2:
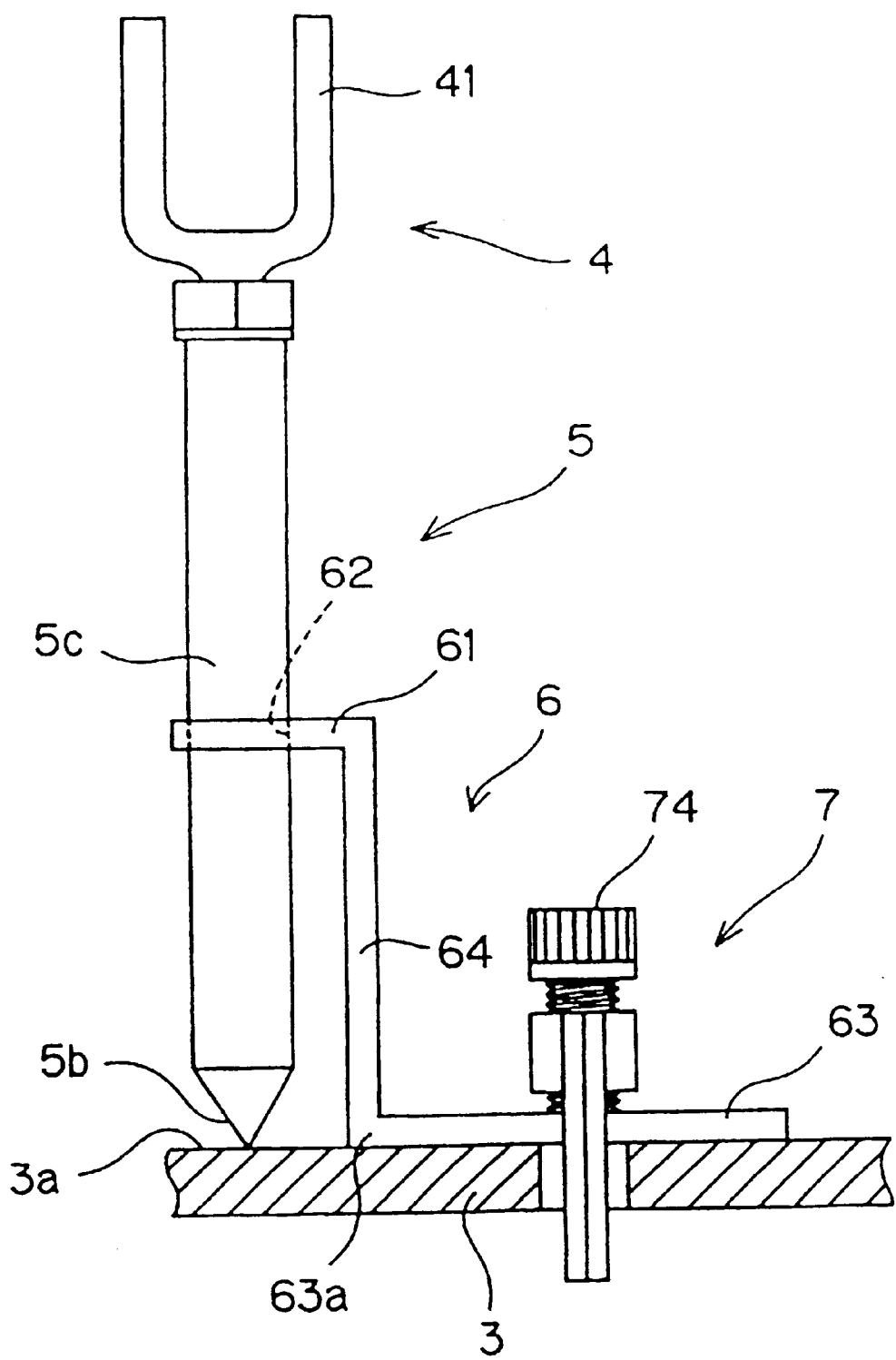
FIG. 2 is a side view, partly in section, of the wiring jig of FIG. 1.

FIG. 2 of the drawings shows a side view of the wiring jig 1. The cable receiving area 4 is provided with a U-shaped support 41 for receiving the cable. In this embodiment, a cable receiving area 4 is illustrated, but the invention is not limited to the use of a jig for cable receiving alone i.e., any type of jig may be used so long as it is a jig necessary for assembling a wire harness, such as a connector receiving jig, a clamp mounting jig, an indicating jig for a taping position and the like.

The pillar 5 has a generally circular cross-sectional configuration. The lower end 5b of the pillar 5 has a sharp point of generally conical form. By mounting the lower end 5b to fit against the top surface 3a, the pillar 5 can be mounted at any desired position on the perforated panel 3 with accuracy.

The crank-shaped supporting member 6 is of generally Z-shaped outline which includes an upper horizontal arm or pillar supporting area 61 (note FIG. 2), a lower horizontal arm or bench board 63 and a vertical connection web or board 64 at opposite ends of which the area 61 and the board 63 extend in opposite directions. The supporting member 6 may be formed in any suitable manner, for example, from a flat strip of material having a rectangular cross-section. The bench board 63 is arranged on the top surface 3a of the perforated panel 3, and is pressed against the perforated panel 3 by the use of a pressing screw 74 of the pressing member 7 as described in more detail below.

The connection board 64 is provided for connecting the pillar supporting area 61 and the bench board 63, and extends generally perpendicularly from one end 63a of the bench board 63 to one end of the pillar supporting area 61. The pillar supporting area 61 extends generally parallel to the bench board 63. A generally circular hole 62 which receives the pillar 5 is formed on the rear central part of the pillar supporting area 61. The pillar supporting area 61 supports the pillar 5 in an area 5c intermediate its ends, and is fixed within the hole 62 in any suitable manner, for example, by adhesive bonding, welding, brazing, or the like. In this way, since the supporting member 6 is provided to have a crank-shape, the supporting member 6 can support the intermediate area 5c of the pillar 5 in such a manner that the pillar 5 is stabilized.

Figure 3:
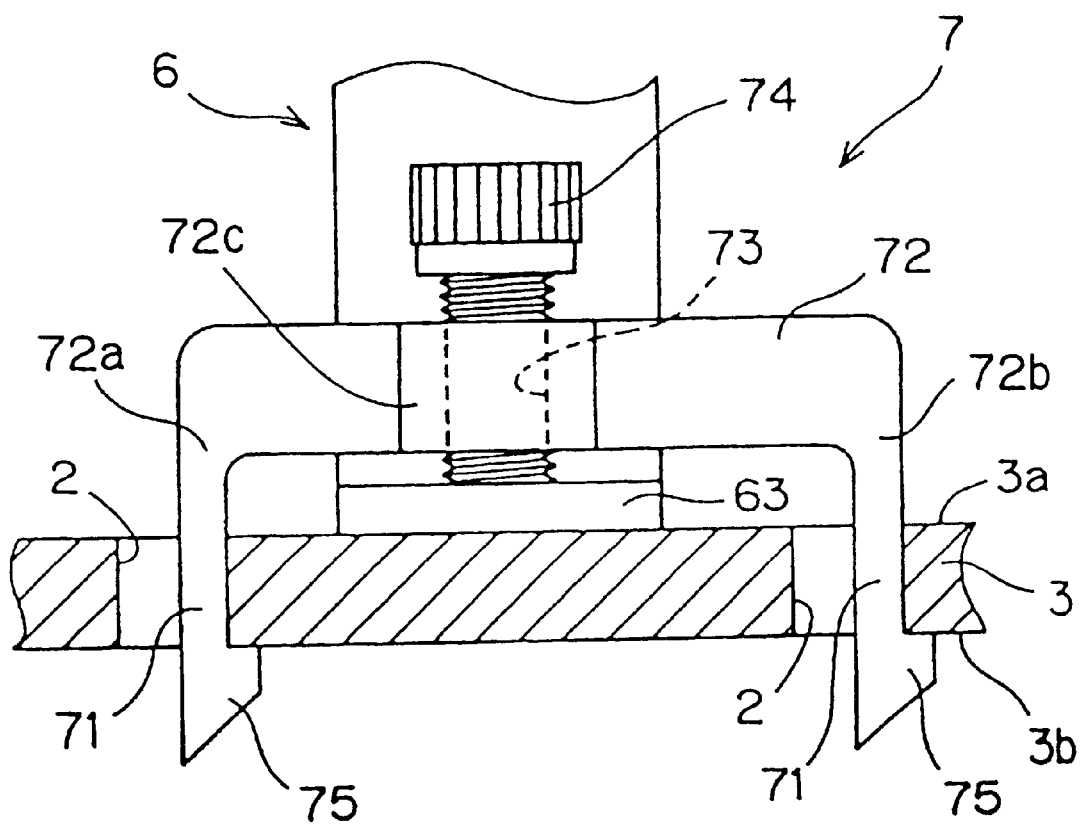
FIG. 3 is a front view, partly in section, of a part of the wiring jig of FIG. 1.

FIG. 3 of the drawings illustrates in detail the construction of the pressing member 7. The pressing member 7 is formed to have a generally U-shaped configuration and fastens the supporting member 6 onto the perforated panel 3. The pressing member 7 includes a transverse bar or bridge 72 which is connected at opposite ends 72a and 72b to a pair of feet 71. At the lower end of each foot 71, protrusions 75 are provided for engaging with the bottom surface 3b of perforated panel 3. The engaging protrusions 75 extend in the same direction, for example, toward the right as seen in FIG. 3.

The pressing member 7 is mounted on the top surface 3a of the perforated panel 3 by inserting the feet 71 within two mounting holes 2, which are adjacent to each other, from the top surface 3a of the perforated panel 3. The member 7 is then displaced in a transverse direction to cause the protrusions 75 to engage with the bottom surface 3b of the perforated panel 3.

Furthermore, as shown in FIG. 3, the transverse member 72 spans the top surface 3a of the bench board 63 of the support member 6. The intermediate area 72c of the transverse bar 72 is enlarged to accommodate a screw hole 73 which extends in an upright direction through the intermediate area 72c. The pressing screw 74 is screwed into the screw hole 73 from the upper side. Tightening the pressing screw 74 causes the bench board 63 to press against the top surface 3a of the perforated 10 panel with the feet 71 lifting up to engage the bottom surface in order to secure the supporting member 6 on the perforated panel 3. In the embodiment illustrated in FIG. 1 and FIG. 2, the pressing member 7 and the transverse bar 72 are formed of two parts which are laminated together, with the laminations expanded apart to form the screw hole 73. However, the pressing member 7 may be formed in any suitable manner, for example, by molding or shaping.

In this way, since the feet 71 of the pressing member 7 interfit with two mounting holes 2, the wiring jig 1 is easily fastened and the mounting strength of the wiring jig 1 is satisfactory. In addition, securing the support member 6 from the top surface 3a only of the perforated panel 3 makes it possible to mount and remove the wiring jig 1 from one side of the perforated panel 3 without requiring access to the other side of the panel 3.

Figure 4:
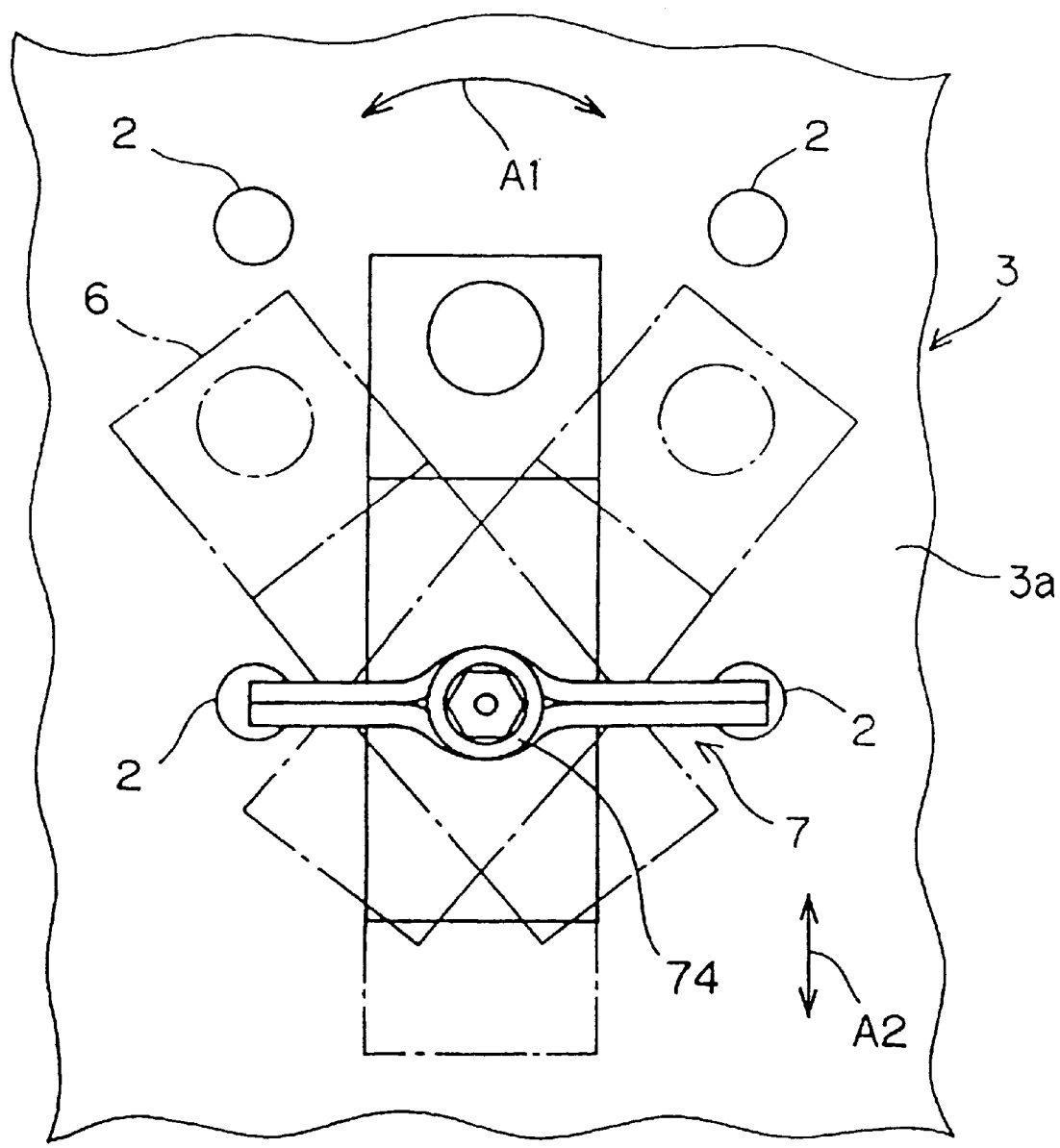
FIG. 4 is a plan view of the wiring jig of FIG. 1.

FIG. 4 depicts a plan view of the wiring jig 1. As shown, loosening the pressing screw 74 allows the supporting member 6 to rotate in a direction shown by the arrow A1 and/or to slide in a direction shown by the arrow A2. That is, the position of pillar 5 can be adjusted to any desired position without being restricted by the position of the mounting holes 2 which are pre-formed at predetermined positions in the perforated panel 3.

In addition, even after mounting the wiring jig 1 on the perforated panel 3, only adjustment to the pressing screw 74 is required to easily change the position of the pillar 5. In this way, it is quite possible to carry out easy mounting and removal of the supporting member 6 from the top surface 3a of the perforated panel 3 as well as to support the cable at any position with considerable accuracy. In other words, access to the underside or bottom surface 3b of the perforated panel 3 to secure the supporting member 6 mounting the jig is unnecessary due to the present invention.

Each of the above described elements of the wiring jig 1 of the present invention may be formed from any suitable material, for example, metal or structural plastic. Additionally, the feet of the pressing member may be formed in any suitable manner, such as by molding, shaping, or bending, and the feet may extend in any direction as long as both feet extend in the same direction.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. JP 10-334602, filed on Nov. 25, 1998, which is herein expressly incorporated by reference in its entirety.

What is claimed is:

1. A fixture for fastening a wire harness assembling jig on a perforated panel in which multiple holes are formed and arranged with a predetermined spacing, said fixture comprising:
   a supporting member for supporting an assembly jig; and
   a pressing mechanism that secures said supporting member to the perforated panel, said pressing mechanism including a pressing member configured to press said supporting member between said pressing mechanism and the panel, said pressing member having a pair of feet that position said pressing mechanism from one side of the panel by interfitting a respective one of said pair of feet within a pair of mounting holes in close proximity to each other.

2. A fixture according to claim 1, wherein said pair of feet penetrate through respective ones of said holes in the perforated panel and are provided with protrusions that engage with the other side of the perforated panel.

3. A fixture according to claim 1, wherein said supporting member includes a pillar supporting area that interfits with a pillar, and said supporting member includes a bench board that engages the perforated panel; and
   said pressing member includes a transverse portion which spans said bench board and is provided at opposite ends with one of said pair of feet, and a pressing screw provided on the transverse portion for pressing against the bench board.

4. An assembly jig for assembling wire harnesses fastened on a perforated panel in which multiple holes are formed and arranged with a predetermined spacing, said jig comprising:
   predetermined parts for use in assembling the wiring harness;
   a pillar having a pointed lower end which supports the parts from a lower end;
   a supporting member that supports said pillar; and
   a pressing mechanism that presses and fastens said supporting member to the perforated panel, said pressing mechanism including a pressing member configured to press said supporting member between said pressing mechanism and the perforated panel, said pressing member having a pair of feet that position said pressing mechanism from one side of the panel by interfitting with a respective one of a pair of mounting holes in close proximity to each other.

5. An assembly jig according to claim 4, wherein said pair of feet penetrate through respective ones of said holes in the perforating panel and are provided with protrusions that engage with the other side of the perforated panel.

6. An assembly jig according to claim 4, wherein said supporting member includes a pillar supporting area that interfits with said pillar and a bench board that engages with the perforated panel; and
   said pressing member includes a transverse portion which spans said bench board and is provided at opposite ends with one of said pair of feet, and a pressing screw provided on the transverse portion for pressing against the bench board.

7. A bracket assembly for mounting a wire harness jig on a base panel, said bracket assembly comprising:
   a support member for a wire harness jig; and
   a pressing member for connection to a panel, said pressing member having a pair of feet configured to be received in corresponding holes in the panel, and a clamping member configured to press said support member against an upper surface of the panel and cause said feet to engage a lower surface of the panel to connect said pressing member to the panel and secure said support member between said pressing member and the panel.

8. A bracket assembly according to claim 7, wherein said clamping member is releasable to adjust the position of said support member relative to said pressing member.

9. A bracket assembly according to claim 8, wherein said support member is rotatable relative to said pressing member.

10. A bracket assembly according to claim 8, wherein said support member is slidable relative to said pressing member.

11. A bracket assembly according to claim 8, wherein said clamping member comprises a clamping screw that releasably secures said support member.

12. A bracket assembly according to claim 7, wherein said pressing member includes a transverse bridge portion connecting the feet, said bridge portion being spaced above the upper surface of the panel and mounting said clamping member, and said support member includes a base portion located under said bridge portion between said feet and engaged by said clamping member for securing said support member.

13. A bracket assembly according to claim 12, wherein said support member includes a locating portion that receives a pillar of the wire harness jig, said locating portion and said base portion being arranged at opposite ends of a connection portion, whereby in use, said locating portion is spaced from the upper surface of the panel.

14. A bracket assembly according to claim 13, wherein said pillar includes a pointed lower end that positions said pillar on the panel.

15. A bracket assembly according to claim 13, wherein said locating portion includes a hole in which said pillar is received and fixed intermediate its ends.

16. A bracket assembly according to claim 13, wherein said base portion and said locating portion extend parallel to each other in opposite directions from opposite ends of said connection portion.

17. An apparatus comprising:

a perforated base panel formed with a plurality of holes having a predetermined spacing;

a bracket assembly for mounting a wire harness jig on said base panel, said bracket assembly comprising;

a support member for the wire harness jig; and a pressing member for connection to said panel, said pressing member having a pair of feet configured to be received in corresponding ones of said holes in said panel, and a clamping member configured to press said support member against an upper surface of said panel and cause said feet to engage a lower surface of said panel to connect said pressing member to said panel and secure said support member between said pressing member and said panel.

18. The apparatus according to claim 17, wherein said holes are aligned in two directions at right angles to each other.

19. The apparatus according to claim 18, wherein said holes are uniformly spaced apart in each direction.

20. The apparatus according to claim 19, wherein said spacing of said holes in one direction is different to that in the other direction.

* * * * *